United States Patent
Maleck

(10) Patent No.: US 6,681,281 B1
(45) Date of Patent: Jan. 20, 2004

(54) SYSTEM AND METHOD FOR IMPLEMENTING A MULTI-LEVEL INTERRUPT SCHEME IN A COMPUTER SYSTEM

(75) Inventor: Timothy C. Maleck, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 485 days.

(21) Appl. No.: 09/715,606

(22) Filed: Nov. 17, 2000

(51) Int. Cl.[7] ............................................... G06F 13/26
(52) U.S. Cl. ...................... 710/261; 710/260; 710/264; 340/825.5
(58) Field of Search ................................ 710/260–266, 710/36, 306, 48, 312, 240; 709/225, 232; 370/402, 462; 340/825.51; 379/93.05; 375/222

(56) References Cited

U.S. PATENT DOCUMENTS

| | | | |
|---|---|---|---|
| 4,788,639 A | | 11/1988 | Tamaru |
| 5,125,093 A | * | 6/1992 | McFarland |
| 5,392,033 A | * | 2/1995 | Oman et al. |
| 5,555,420 A | * | 9/1996 | Sarangdhar et al. |
| 5,555,430 A | | 9/1996 | Gephardt et al. |
| 5,758,105 A | | 5/1998 | Kelley et al. |
| 5,828,891 A | * | 10/1998 | Benayoun et al. |
| 5,905,898 A | | 5/1999 | Qureshi et al. |
| 5,918,057 A | | 6/1999 | Chou et al. |
| 6,041,105 A | * | 3/2000 | Wu et al. |
| 6,070,221 A | | 5/2000 | Nakamura |
| 6,484,281 B1 | * | 11/2002 | Wang et al. |

FOREIGN PATENT DOCUMENTS

| JP | 09244991 | 9/1997 |
|---|---|---|
| JP | 11232210 | 8/1999 |

OTHER PUBLICATIONS

International Search Report application No. PCT/US01/24690, mailed Apr. 24, 2002.

* cited by examiner

Primary Examiner—Gopal C. Ray
(74) Attorney, Agent, or Firm—Meyertons Hood Kivlin Kowert & Goetzel, P.C.; B. Noël Kivlin

(57) ABSTRACT

A system and method for implementing a multi-level interrupt scheme in a computer system is provided. Bus devices and a bus controller may be coupled to a shared bus in a computer system. The bus may include an interrupt line for each bus device coupled to the bus. A bus device may be configured to convey an interrupt using its designated interrupt line. Each bus device may be configured to convey different types of interrupt signals on its interrupt line depending on an interrupt priority level of a given interrupt. The bus controller may be configured to receive interrupt signals from each bus device coupled to the bus and may arbitrate amongst the interrupt signals based on the interrupt priority level of each interrupt signal. The bus controller may grant the interrupt that corresponds to the highest priority level. If multiple interrupts correspond to the same highest priority level in a group of interrupts, then the bus controller may use any suitable arbitration scheme to grant an interrupt.

17 Claims, 4 Drawing Sheets

SYSTEM AND METHOD FOR IMPLEMENTING A MULTI-LEVEL INTERRUPT SCHEME IN A COMPUTER SYSTEM

BACKGROUND OF THE INVENTION

1. Field of the Invention

This invention relates generally to the field of computer systems and, more particularly, to bus interrupt systems in computer systems.

2. Description of the Related Art

Computer systems may include many devices that perform different functions. Each device may perform general functions or specific functions depending on the device the type of system. The devices typically interact with the central processing unit (CPU) in the system. To do so, many of the devices may be coupled to a bus that may be coupled to the CPU. These devices may be referred to as bus devices. A bus may be directly coupled to the CPU or may be coupled to the CPU using a bus bridge. Examples of busses may include a PCI bus, an EISA/ISA bus, and a USB bus. Each of these busses may conform to a bus protocol that may be described in a bus specification. A bus devices may include hardware or software to allow it to conform to a bus protocol.

In certain bus architectures, a bus device may signal its need to communicate with a CPU by using an interrupt. A bus device may convey an interrupt signal to a bus controller using a dedicated interrupt line for that bus device. The bus device may convey an interrupt signal by simply asserting its interrupt line. A bus controller may receive interrupt signals from bus devices and, in the case of conflicting interrupt requests, may arbitrate between the interrupt requests and grant an interrupt to one of the bus devices that corresponds to one of the conflicting interrupt requests. The manner in which a bus controller arbitrates between conflicting interrupt requests may vary between computer systems according to an arbitration scheme used by the bus controller. The arbitration scheme may be a round robin system or a system where certain bus devices are given priority over other types of bus devices, for example. The bus device whose interrupt request is granted may communicate with the CPU.

Recent bus devices, such as software modems, may perform operations that are increasingly time critical and may require faster responses to interrupt requests. Arbitration schemes used by bus controllers, however, may not be sensitive to these increasing needs. When interrupt requests conflict, problems may occur where a bus controller grants an interrupt to a bus device whose needs may be less time sensitive than another bus device. In the case of a software modem, for example, a connection may be dropped if an interrupt request of the modem is not granted over a conflicting interrupt request of another device. This type of situation may be avoidable if a bus controller was able to determine that one bus device has a more time sensitive interrupt request than another when interrupt requests conflict. A system and method is needed to allow a bus device to indicate an interrupt priority level to a bus controller. Further, a system and method for allowing a bus device to indicate an interrupt priority level to a bus controller is needed that may be incorporated into existing bus architectures.

SUMMARY

The problems outlined above are in large part solved by the use of the system and method described herein. Generally speaking, a system and method for implementing a multi-level interrupt scheme in a computer system is provided. Bus devices and a bus controller may be coupled to a shared bus in a computer system. The bus may include an interrupt line for each bus device coupled to the bus. A bus device may be configured to convey an interrupt using its designated interrupt line. Each bus device may be configured to convey different types of interrupt signals on its interrupt line depending on an interrupt priority level of a given interrupt. The bus controller may be configured to receive interrupt signals from each bus device coupled to the bus and may arbitrate amongst the interrupt signals based on the interrupt priority level of each interrupt signal. The bus controller may grant the interrupt that corresponds to the highest priority level. If multiple interrupts correspond to the same highest priority level in a group of interrupts, then the bus controller may use any suitable arbitration scheme to grant an interrupt.

The system and method described herein may provide performance advantages over other systems and methods. The use of a multi-level interrupt scheme may allow a bus controller to more appropriately grant an interrupt among a group of conflicting interrupt requests by determining the priority of each interrupt request. By determining the priority of each of a group of interrupt requests, a bus controller may ensure that a bus device receives timely servicing of its interrupt. The system and method described herein may also be implemented using existing bus hardware. A bus device may indicate different interrupt priority levels by conveying different signals to a bus controller on an existing interrupt line. Accordingly, the system and method described herein may be incorporated into existing bus systems.

In one embodiment, a bus device may convey interrupt signals with different frequencies to indicate an interrupt priority level. The bus device may convey an interrupt signal with a first frequency to indicate a first priority level and may convey the interrupt signal with a second frequency to indicate a second priority level. The use of other signal frequencies may indicate other priority levels. In another embodiment, a bus device may convey interrupt signals with different duty cycles to indicate an interrupt priority level. The bus device may convey an interrupt signal with a first duty cycle to indicate a first priority level and may convey the interrupt signal with a second duty cycle to indicate a second priority level. The use of other pulse duty cycles may indicate other priority levels.

BRIEF DESCRIPTION OF THE DRAWINGS

Other objects and advantages of the invention will become apparent upon reading the following detailed description and upon reference to the accompanying drawings in which.

Figure 1:
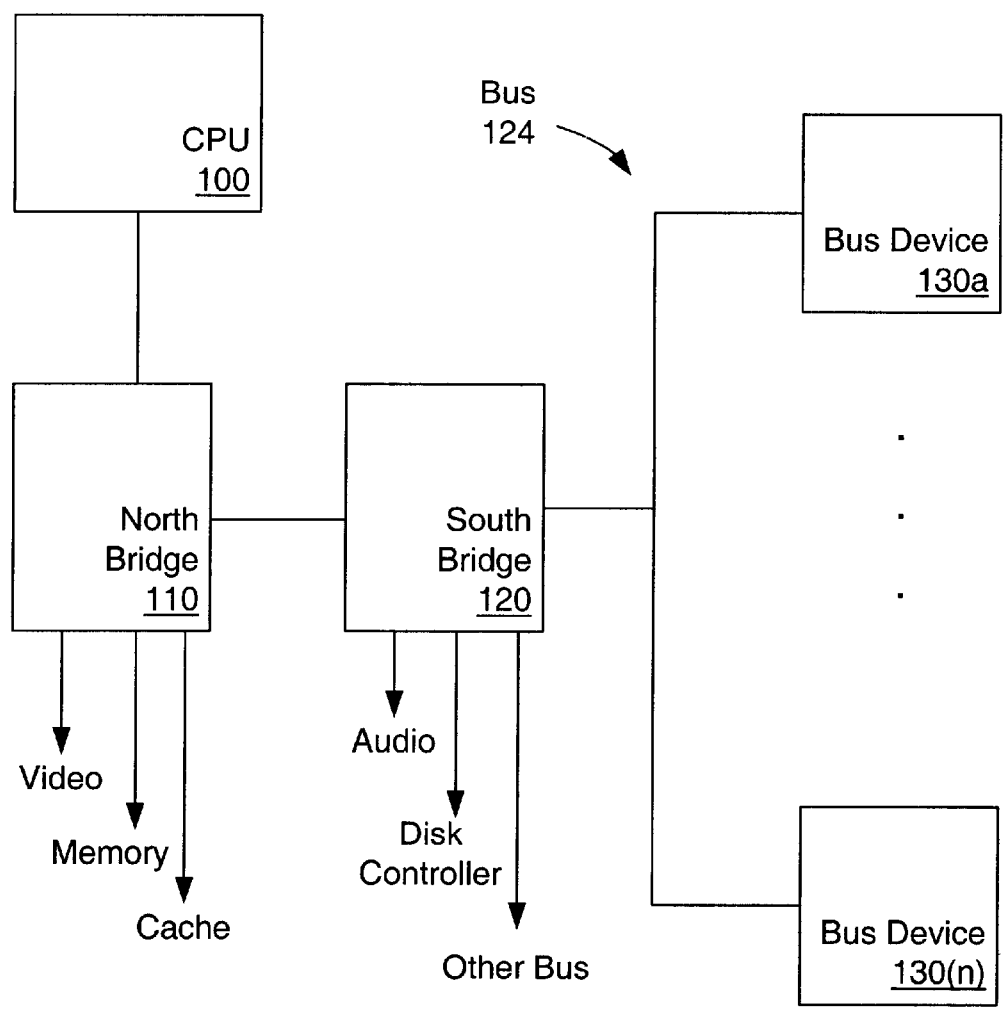
FIG. 1 is a block diagram illustrating one embodiment of a computer system configured to implement a multi-level interrupt scheme.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Turning now to FIG. 1, a block diagram illustrating one embodiment of a computer system configured to implement a multi-level interrupt scheme is shown. FIG. 1 depicts CPU 100 coupled to north bridge 110 and south bridge 120. South bridge 120 is coupled to bus 124 as are bus devices 130a through 130(n). Bus devices 130a through 130(n) may be any suitable devices, including a software modem, and may be referred to collectively as "bus devices 130" or individually as "bus device 130". As indicated by the dots between bus devices 130a and 130(n), any number of bus devices 130 may be coupled to bus 124 consistent with a bus protocol of bus 124. North bridge 110 and south bridge 120 may comprise a chipset. North bridge 110 may also be coupled to a video subsystem, a memory subsystem, and a cache, and south bridge 120 may be coupled to an audio subsystem, a disk controller, and another bus as indicated in FIG. 1.

FIG. 1 depicts a system in which a multi-level interrupt scheme in a computer system may be implemented. Bus 124 may be a shared bus such as a PCI bus or other type of shared bus and may include an interrupt line for each bus device 130 coupled to the bus. Each bus device 130 may be configured to convey an interrupt using its designated interrupt line. Each bus devices 130 may be configured to convey different types of interrupt signals on its respective interrupt line depending on an interrupt priority level of a given interrupt. A bus controller located in south bridge 120 may be configured to receive interrupt signals from each bus device coupled to the bus and may arbitrate between conflicting interrupt signals based on the interrupt priority level of each interrupt signal. The bus controller may grant the interrupt that corresponds to the highest priority level. If multiple interrupt requests correspond to the same highest priority level in a group of interrupt requests, then the bus controller may use any suitable arbitration scheme to grant an interrupt.

Figure 2:
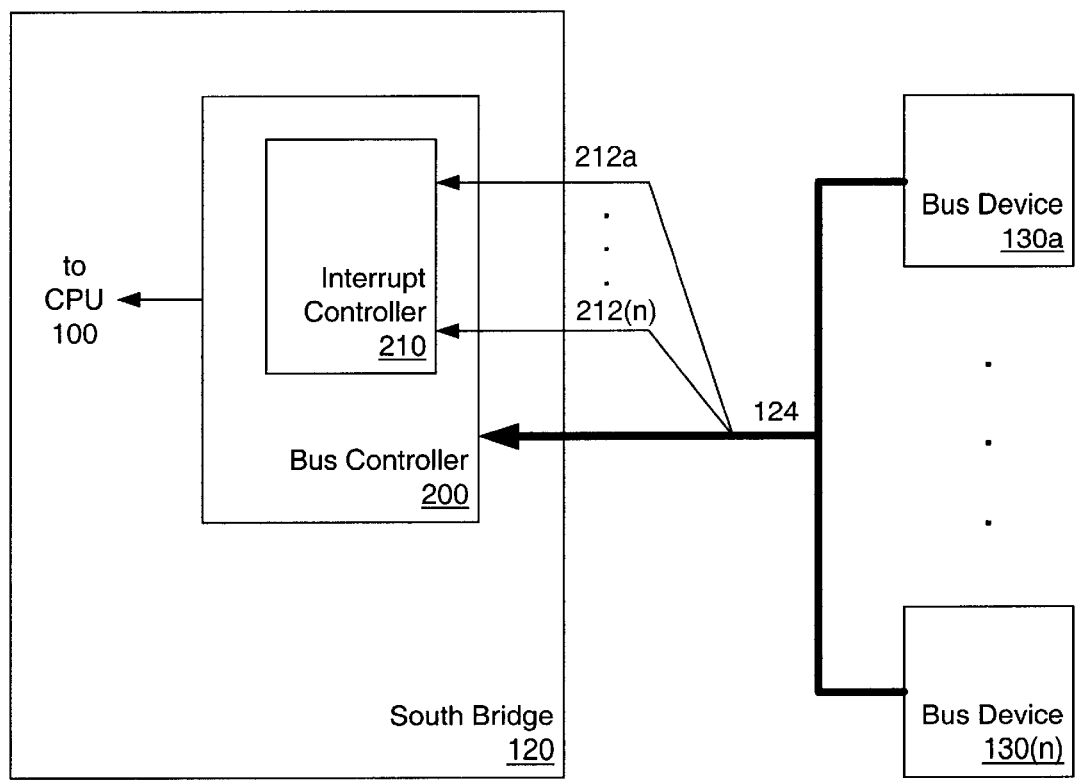
FIG. 2 is a block diagram illustrating one embodiment of a computer system configured to implement a multi-level interrupt scheme.

Turning now to FIG. 2, a block diagram illustrating one embodiment of a computer system configured to implement a multi-level interrupt scheme is shown. FIG. 2 depicts south bridge 120 coupled to bus devices 130a through 130(n) via bus 124. South bridge 120 includes bus controller 200 which includes interrupt controller 210. Bus 124 includes interrupt lines 212a through 212(n) as indicated. Interrupt lines 212a through 212(n) may correspond to bus devices 130a though 130(n), respectively. Interrupt lines 212a through 212(n) may be referred to collectively as "interrupt lines 212" or individually as "interrupt line 212".

To request an interrupt, bus devices 130 may be configured to convey an interrupt signal on their respective interrupt lines 212. Each bus device 130 may be configured to convey different signals on its interrupt line 212 depending on an interrupt priority level. Interrupt controller 210 may be configured to receive interrupt signals from each bus device 130 on interrupt lines 212 and may arbitrate between conflicting interrupt requests based on the interrupt priority level each interrupt signal embodies. Interrupt controller 210 may grant the interrupt that corresponds to the highest priority level. If multiple interrupt requests correspond to the same highest priority level in a group of interrupt requests, then interrupt controller 210 may use any suitable arbitration scheme to grant an interrupt.

The multi-level interrupt scheme shown in FIG. 2 may provide performance advantages over other systems. The use of a multi-level interrupt scheme may allow interrupt controller 210 in bus controller 200 to more appropriately grant an interrupt among a group of conflicting interrupt requests from bus devices 130 by determining the priority of each interrupt request. By determining the priority of each of a group of interrupt requests, interrupt controller 210 may be able to ensure that a bus device 130 receives timely servicing of its interrupt.

The system of FIG. 2 may be implemented using existing bus hardware. A bus device 130 may indicate different interrupt priority levels by conveying different signals to a bus controller on an interrupt line 212. Accordingly, the system and method described herein may be incorporated into existing bus systems such as a PCI bus where an interrupt line for each bus device are required by the bus specification.

Figure 3A:
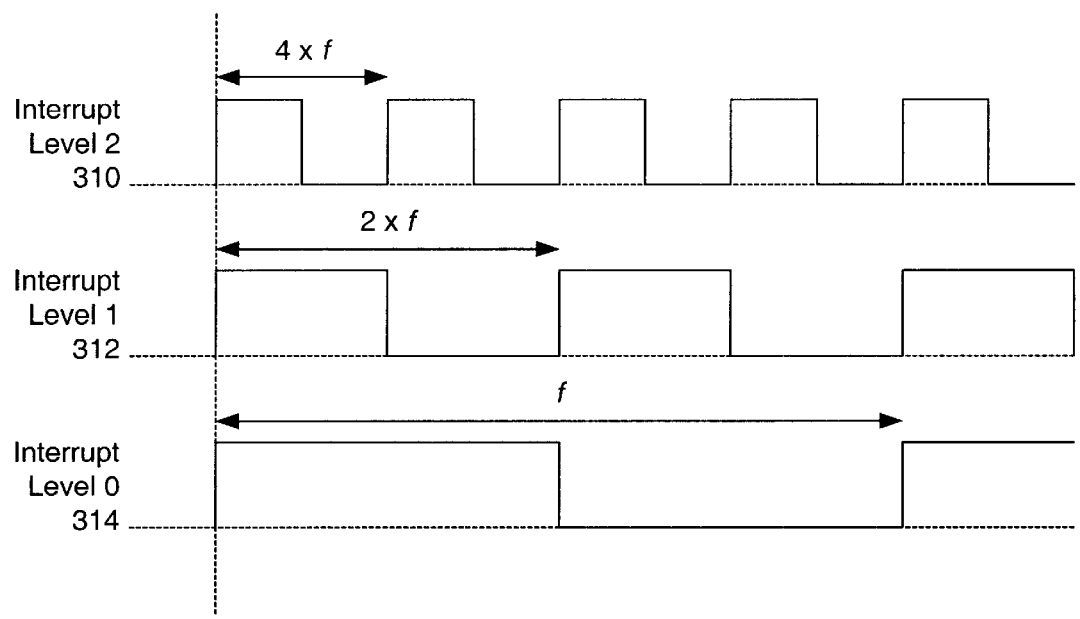
FIG. 3a is a timing diagram illustrating one embodiment of a multi-level interrupt scheme.

In one embodiment, a bus device 130 may convey interrupt signals with different frequencies to indicate an interrupt priority level. FIG. 3a depicts a timing diagram that illustrates an embodiment of a multi-level interrupt scheme where different frequencies are used to indicate different priority levels. In the example of FIG. 3a, three interrupt priority levels, interrupt level 2 310, interrupt level 1 312, and interrupt level 0 314, are shown. Interrupt level 2 310 may correspond to a highest priority interrupt, interrupt level 1 312 may correspond to a next highest priority interrupt, and interrupt level 0 314 may correspond to a lowest priority interrupt. Other embodiments may include other numbers of interrupt priority levels. As may be seen, interrupt level 0 314 may correspond to a first frequency, $f$, interrupt level 1 312 may correspond to a second frequency, $2 \times f$, and interrupt level 2 310 may correspond to a third frequency, $4 \times f$.

In this embodiment, interrupt controller 210 may be configured to grant an interrupt between conflicting interrupt requests from bus devices 130 using the frequency of each conflicting interrupt signal it receives. For example, if bus device 130a conveyed an interrupt signal at a frequency off and bus device 130(n) conveyed a conflicting interrupt signal at a frequency of $4 \times f$, then interrupt controller 210 may be configured to grant the interrupt to bus device 130(n) since an interrupt signal at a frequency of $4 \times f$ corresponds to higher interrupt priority level than an interrupt signal at a frequency of $f$, i.e. interrupt level 2 310 versus interrupt level 0 314. If two or more bus devices 130 conveyed conflicting interrupt signals that corresponded to the same priority level, i.e. at the same frequency, then interrupt controller 210 may be configured to grant an interrupt to one of the bus devices 130 based on an arbitration scheme such as a round robin arbitration scheme.

Figure 3B:
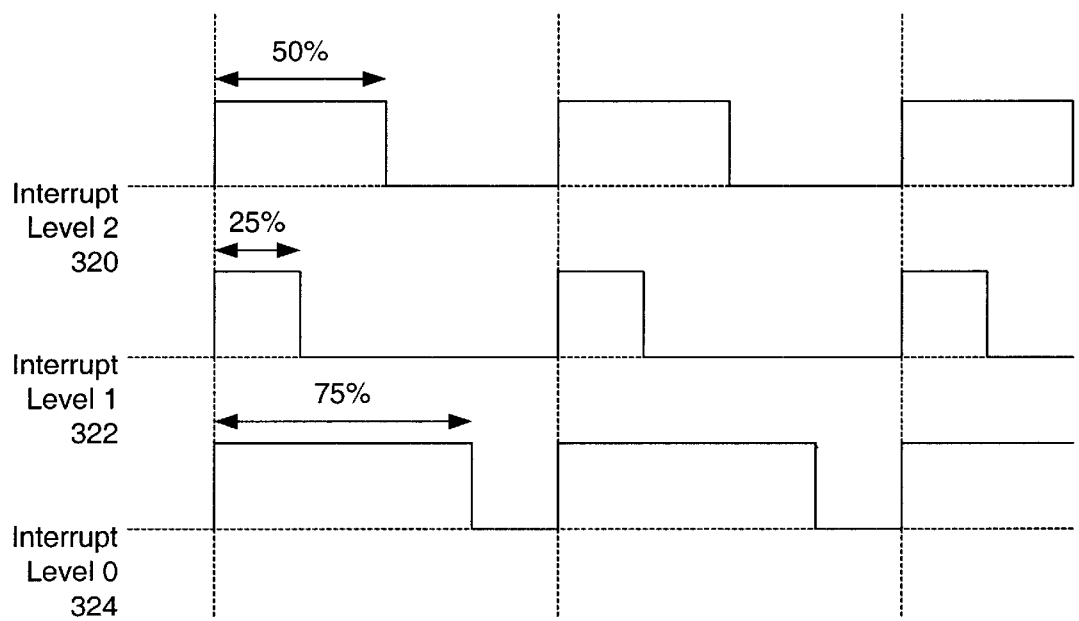
FIG. 3b is a timing diagram illustrating one embodiment of a multi-level interrupt scheme.

In another embodiment, a bus device 130 may convey interrupt signals with different duty cycles to indicate an interrupt priority level. FIG. 3b depicts a timing diagram that illustrates an embodiment of a multi-level interrupt scheme where different duty cycles are used to indicate different priority levels. In the example of FIG. 3b, three interrupt priority levels, interrupt level 2 320, interrupt level 1 322, and interrupt level 0 324, are shown. Interrupt level 2 320 may correspond to a highest priority interrupt, interrupt level 1 322 may correspond to a next highest priority interrupt, and interrupt level 0 324 may correspond to a lowest priority interrupt. Other embodiments may include other numbers of interrupt priority levels. As may be seen, interrupt level 2 320 may correspond to a 50% high duty cycle, interrupt level 1 322 may correspond to a 25% high duty cycle, and interrupt level 0 324 may correspond to a 75% high duty cycle.

In this embodiment, interrupt controller 210 may be configured to grant an interrupt between conflicting interrupt requests from bus devices 130 using the duty cycle of each conflicting interrupt signal it receives. For example, if bus device 130a conveyed an interrupt signal at a 75% high duty cycle and bus device 130(n) conveyed a conflicting interrupt signal at a 50% high duty cycle, then interrupt controller 210 may be configured to grant the interrupt to bus device 130(n) since an interrupt signal at a 50% high duty cycle corresponds to higher interrupt priority level than an interrupt signal at a 75% high duty cycle, i.e. interrupt level 2 320 versus interrupt level 0 324. If two or more bus devices 130 conveyed conflicting interrupt signals that corresponded to the same priority level, i.e. at the same duty cycle, then interrupt controller 210 may be configured to grant an interrupt to one of the bus devices 130 based on an arbitration scheme such as a round robin arbitration scheme.

Figure 4:
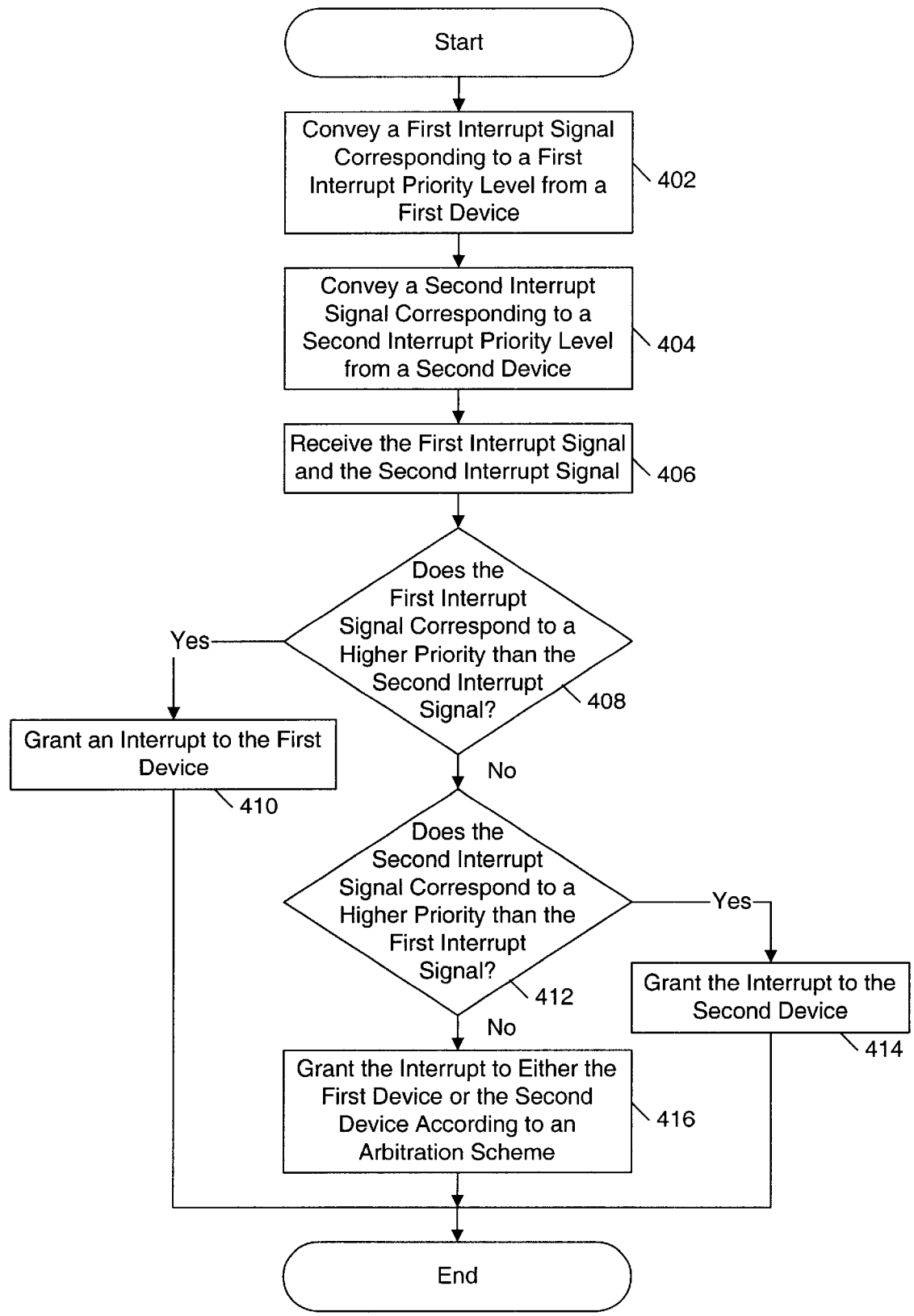
FIG. 4 is a flow chart illustrating a method implementing a multi-level interrupt scheme.

Turning now to FIG. 4, a flow chart illustrating a method implementing a multi-level interrupt scheme is shown. Variations on the method are possible and contemplated. A first interrupt signal may be conveyed from a first device as indicated in block 402. A second interrupt signal may be conveyed from a second device as indicated in block 404. The first interrupt signal and the second interrupt signal may be received as indicated in block 406. In block 408, a determination may be made as to whether the first interrupt signal corresponds to a higher priority than the second interrupt signal. If the first interrupt signal corresponds to a higher priority than the second interrupt signal, then an interrupt may be granted to the first device as indicated in block 410.

If the first interrupt signal does not correspond to a higher priority than the second interrupt signal, then a determination may be made as to whether the second interrupt signal corresponds to a higher priority than the first interrupt signal as indicated in block 412. If the second interrupt signal corresponds to a higher priority than the first interrupt signal, then the interrupt may be granted to the first device as indicated in block 414. If the second interrupt signal does not correspond to a higher priority than the first interrupt signal, then the interrupt may be granted to either the first device or the second device according to an arbitration scheme as indicated in block 416.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

I claim:

1. A system comprising:
  a first device;
  a bus coupled to said first device; and
  a bus controller coupled to said bus;
  wherein said bus includes a first interrupt line corresponding to said first device, wherein said first device is configured to convey a first interrupt signal corresponding to a first interrupt priority level to said bus controller using said first interrupt line, and wherein said first device is configured to convey a second interrupt signal corresponding to a second interrupt priority level to said bus controller using said first interrupt line, and wherein said first interrupt signal has a first duty cycle, wherein said second interrupt signal has a second duty cycle, and wherein said first duty cycle is different from said second duty cycle.

2. The system of claim 1, wherein said first interrupt signal corresponds to a first frequency, wherein said second interrupt signal corresponds to a second frequency, and wherein said first frequency is different from said second frequency.

3. The system of claim 1, further comprising:
  a second device coupled to said bus;
  wherein said bus includes a second interrupt line corresponding to said second device, wherein said second device is configured to convey a third interrupt signal corresponding to said first interrupt priority level to said bus controller using said second interrupt line, and wherein said second device is configured to convey a fourth interrupt signal corresponding to said second interrupt priority level to said bus controller using said second interrupt line.

4. The system of claim 3, wherein said first device is configured to convey said first interrupt signal during a first time period, wherein said second device is configured to convey said fourth interrupt signal during said first time period, and wherein said bus controller is configured to grant a first interrupt to said first device in response to receiving said first interrupt signal and said fourth interrupt signal during said first time period.

5. The system of claim 4, wherein said first device is configured to convey said second interrupt signal during a second time period, wherein said second device is configured to convey said third interrupt signal during said second time period, and wherein said bus controller is configured to grant a second interrupt to said second device in response to receiving said second interrupt signal and said third interrupt signal during said second time period.

6. The system of claim 3, wherein said first interrupt priority level corresponds to a higher interrupt priority than said second interrupt priority level.

7. A method comprising:
  conveying a first interrupt signal corresponding to a first interrupt priority level from a first device;
  conveying a second interrupt signal corresponding to a second interrupt priority level from a second device;
  receiving said first interrupt signal and said second interrupt signal; and
  granting a first interrupt to said first device in response to said receiving said first interrupt signal and said second interrupt signal and said first interrupt priority level being higher than said second interrupt priority level;
  wherein said first interrupt signal has a first duty cycle, wherein said second interrupt signal has a second duty cycle, and wherein said first duty cycle is different from said second duty cycle.

8. The method of claim 7, wherein said first interrupt signal corresponds to a first frequency, wherein said second interrupt signal corresponds to a second frequency, and wherein said first frequency is different from said second frequency.

9. The method of claim 7, further comprising:
  granting said first interrupt to said second device in response to said receiving said first interrupt signal and said second interrupt signal and said second interrupt priority level being higher than said first interrupt priority level.

10. The method of claim 9, further comprising:

granting said first interrupt to said first device or said second device according to an arbitration scheme in response to said receiving said first interrupt signal and said second interrupt signal and said first interrupt priority level being equal to said second interrupt priority level.

11. The method of claim 7, further comprising:

conveying a third interrupt signal corresponding to said second interrupt priority level from said first device;

conveying a fourth interrupt signal corresponding to said first interrupt priority level from said second device;

receiving said third interrupt signal and said fourth interrupt signal; and granting a second interrupt to said second device in response to said receiving said third interrupt signal and said fourth interrupt signal and said first interrupt priority level being higher than said second interrupt priority level.

12. A system comprising:

a processor;

a chipset coupled to said processor;

a first bus device coupled to said chipset; and a second bus device coupled to said chipset;

wherein said first bus device is configured to convey a first interrupt signal corresponding to a first interrupt priority level to said chipset, wherein said second bus device is configured to convey a second interrupt signal corresponding to a second interrupt priority level to said chipset, and wherein said chipset is configured to grant an interrupt to said first bus device in response to said first interrupt priority level being higher than said second interrupt priority level; wherein said first interrupt signal has a first duty cycle, wherein said second interrupt signal has a second duty cycle, and wherein said first duty cycle is different from said second duty cycle.

13. The system of claim 12, wherein said chipset is configured to grant said interrupt to said second bus device in response to said second interrupt priority level being higher than said first interrupt priority level.

14. The system of claim 13, wherein said chipset if configured to grant said interrupt according to an interrupt arbitration scheme in response to said first interrupt priority level being equal to said second interrupt priority level.

15. The system of claim 12, wherein said first interrupt signal corresponds to a first frequency, wherein said second interrupt signal corresponds to a second frequency, and wherein said first frequency is different from said second frequency.

16. The system of claim 12, wherein said chipset includes a north bridge and a south bridge.

17. The system of claim 12, wherein said first bus device comprises a software modem.

\* \* \* \* \*